July 16, 1946.  J. C. DUDDY  2,404,126
BATTERY CONTAINER AND METHOD OF MAKING SAME
Filed Aug. 28, 1941   2 Sheets-Sheet 1

FIG. I.

INVENTOR
Joseph Charles Duddy
BY
Augustus B. Stoughton
ATTORNEY.

WITNESS:
Rob't R. Mitchel

Patented July 16, 1946

2,404,126

UNITED STATES PATENT OFFICE 2,404,126

BATTERY CONTAINER AND METHOD OF MAKING SAME

Joseph Charles Duddy, Philadelphia, Pa., assignor to The Electric Storage Battery Company, Philadelphia, Pa., a corporation of New Jersey Application August 28, 1941, Serial No. 408,630

3 Claims. (Cl. 206—2)

This invention relates to a battery container and the method of making the same and has for its primary object the manufacture at a low cost of an improved light weight battery container.

While not limited thereto, this invention relates to an improved battery container suitable for use with aircraft batteries. Because of its electrical shielding properties, it is desirable to have a metallic container for such batteries. However, such metallic containers and particularly those made from light weight metals are subject to attack by the electrolyte of the battery. It has been proposed to prevent such attack and the resulting corrosion by securing a rubber lining inside the metallic container. While such an arrangement prevents corrosion, the rubber lining is difficult and expensive to apply and the finished product is heavier than desired.

It is a specific object of this invention to provide a new and improved battery container which comprises a light weight metallic container having on its inner surface a firmly bonded continuous layer of material which has high dielectric strength, is capable of withstanding mechanical and thermal stresses, and resists attack by the battery electrolyte.

It is a further specific object of this invention to provide a light weight metallic battery container which is suitable for use as an electrical shield for aircraft batteries and which is provided on its inner surface with a firmly bonded continuous coating of polymerized vinyl resin.

It is a still further specific object of this invention to provide a new and improved method for applying to the inner surface of a battery container an acid and alkaline resisting, abrasion resisting, high dielectric strength coating at a relatively low cost.

Further objects and advantages of this invention will appear as the following description proceeds and the features of novelty which characterize this invention will be set forth in the claims appended to and forming a part of this specification.

Figure 1:
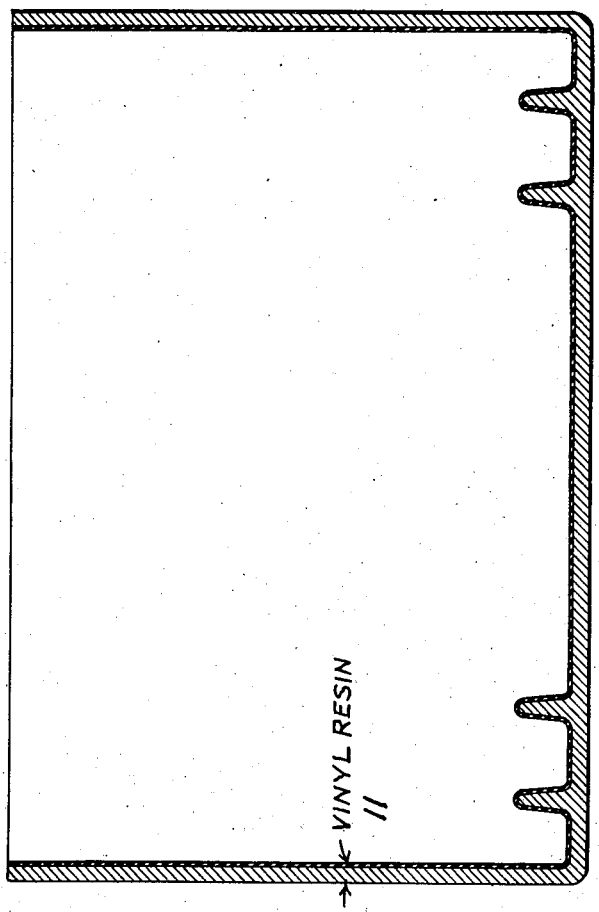
Figure 2:
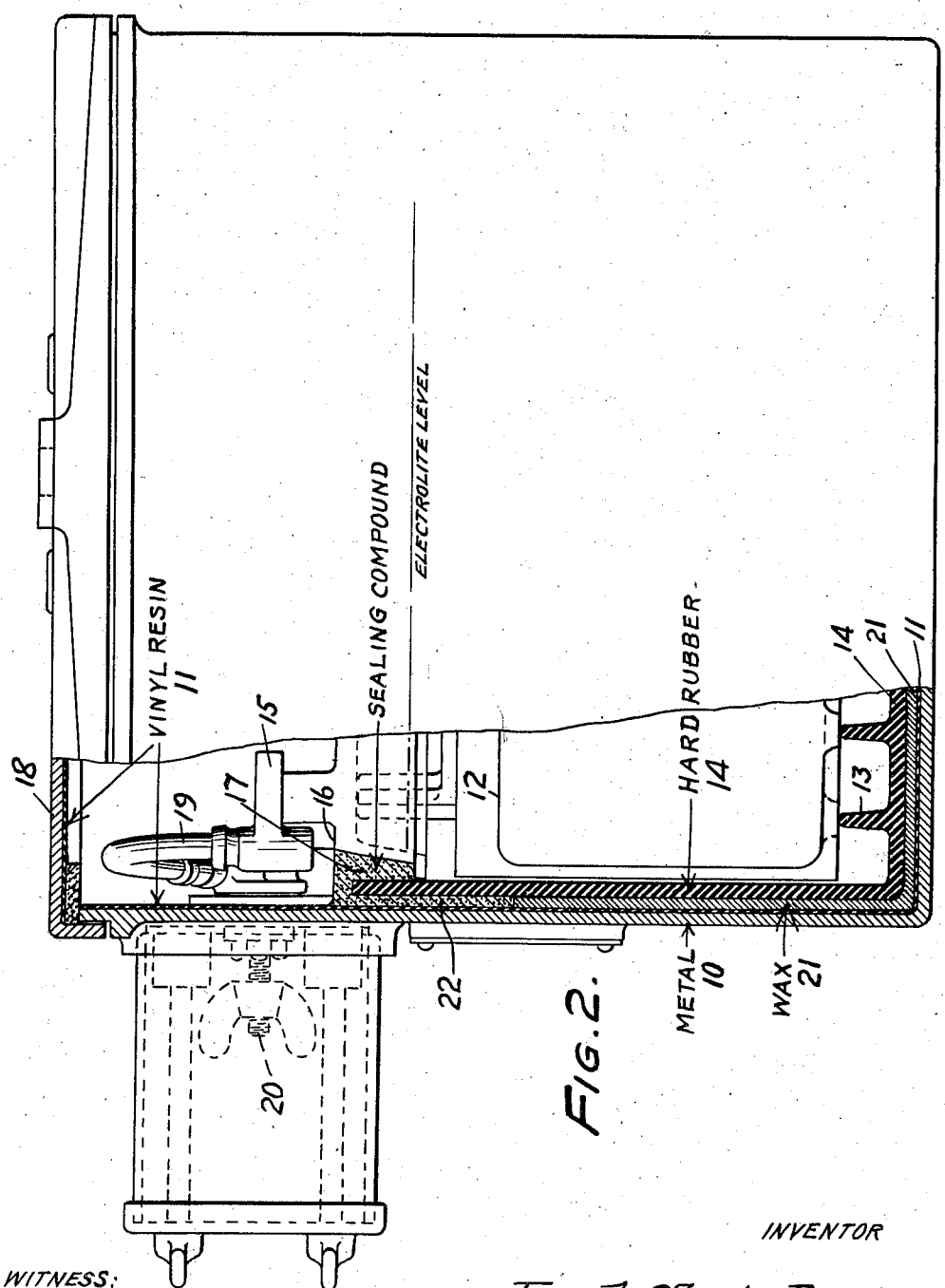

For a more complete understanding of this invention, reference should be had to the accompanying drawings in which:

Figure 1 is a longitudinal sectional view showing the improved battery container of this invention; and Figure 2 is a view, partly in section and partly broken away, showing the improved battery container of this invention applied as an electrical shield for an aircraft battery.

Referring to the drawings it will be observed that the improved battery container of this invention comprises a metallic container 10. This container 10 is preferably die cast from an aluminum alloy although it may, if desired, be fabricated from an aluminum sheet. While it is preferred to employ aluminum, it will be understood that any other metal may be employed and may be lined in accordance with this invention to resist corrosion. However, since weight is of importance in most batteries and particularly in batteries to be used with aircraft, it is preferred to employ a light weight metal such as aluminum or the like.

The light weight metals have proven to be readily corrodible by the electrolyte. There is therefore provided on the inner surface of the container 10 an intimately bonded continuous coating of material capable of protecting the metal against the corrosive effect of the battery electrolyte. In accordance with this invention, the lining 11 is a coating of polymerized vinyl resin and particularly a coating of a copolymer of vinyl chloride and vinyl acetate. Such a coating when applied in accordance with the process to be set forth more fully hereinafter has been found to have the requisite acid and alkali resistance, abrasion resistance, and dielectric properties, and moreover to be unaffected by expansion and contraction of the container with temperature.

In Figure 2 of the drawings there is shown one application of the improved battery container of this invention. More particularly, the container is shown employed as an outer container adapted to shield electrically an aircraft battery from the remaining equipment of the craft. It is to be understood however that this application is shown merely for the purposes of illustration and other applications can be made of the improved container of this invention. For example, it may be used as the sole container or casing for battery elements in certain applications, the lining 11 serving to properly insulate the metallic frame.

Referring to Fig. 2 in more detail, it will be observed that the particular battery illustrated comprises the usual elements or electrodes 12 which are supported on projections 13 provided in the bottom of a casing 14 which is made from a suitable acid resisting material, such as hard rubber. As is well known in the art, the elements 12 are immersed in a suitable electrolyte and a plurality of such elements is provided so as to produce the required battery characteristics. The elements are connected together in groups and the groups are connected to suitable terminal means 15 projecting through the cover 16 for the casing 14. The cover is sealed in place by means of a suitable sealing compound 17.

After the battery has been assembled, it is placed in the metallic container 10 and a cover 18 is provided to enclose the assembly. Flexible connectors 19 are provided for connecting the terminals 15 to the external terminals 20 mounted in the side wall of the container.

The battery assembly is secured in the container 10 in accordance with the invention fully described and claimed in my copending application, Serial No. 409,443, filed September 4, 1941, and assigned to the assignee of the present invention. Briefly however the securing means comprises a layer of wax 21 which seals and secures the bottom portion of the casing 14 and a layer of sealing compound 22 which seals and secures the upper portion of the casing. Both the wax and sealing compound are applied in the liquid state (hot) and upon cooling they securely hold the battery in position. As shown in the drawings, the sealing compound 22 projects part of the way down between the side wall of the battery casing and the container and some of the wax 21 projects up around the bottom of the battery casing. This combination of wax and sealing compound has been found to secure the battery in the container irrespective of the temperature to which the battery is subjected, for the sealing wax has good high temperature characteristics and the sealing compound has good low temperature characteristics. Moreover the wax and sealing compound function to prevent creepage of the electrolyte along the inner wall of the container.

In accordance with this invention there is provided a new and improved but not necessarily the only method for producing the improved battery container shown in Fig. 1 and particularly for applying the lining 11 to the inside of the container. Among the factors to be considered in applying the lining or coating 11 to the battery container 10 is (1) obtaining a lining which intimately bonds to the corrodible metal and is not attacked by the electrolyte during the life of the battery, and (2) obtaining a material which can be simply and easily applied to the inner surface of the container to form an intimately bonded continuous coating thereon. One of the salient features of the improved process of this invention is that the lining 11 may be applied by a spraying operation, thus permitting the production of large quantities of such containers and effecting a substantial saving in the cost per unit.

The complete process for producing the above described lined container will now be described. The metallic container 10 is formed, preferably by die casting it from a suitable aluminum alloy; and after the forming operation is completed, the casing is inspected and thoroughly cleaned to remove any grease or mold lubricant which may be on the surfaces. The surfaces are further prepared by dipping in a solution including phosphoric acid so as to etch the aluminum and leave thereon a deposit of aluminum phosphate which forms a base for further coating operations.

After the containers have been thoroughly cleaned and prepared in this manner, a prime coat is applied to the inner surface. The prime coat applied is one which readily sticks to the cleaned and etched aluminum surface. This prime coat may consist of a resin paint having the following approximate composition by weight:

| | Per cent |
|---|---|
| Solvent naphtha, benzine, xylol, or toluol | 62 to 65 |
| Chlorinated rubber | 15 to 18 |
| Pigments consisting substantially of titanium and silica | 20 |

A prime coat having the above composition has been found to be unsuitable for spraying, particularly in a closely confined space such as the inside of the container 10. However, by diluting the prime coat and spraying at a relatively high pressure, a coating free from "stringing" may be applied to the inner surface of the container. In accordance with this invention the prime material is diluted with a solvent of the class of xylene, toluene or benzine, or a mixture thereof, in the proportion of ten parts of prime to six parts of solvent. After dilution the prime coat is thoroughly agitated, and this agitation continues throughout the spraying operation. The spraying operation is carried on at the relatively high air pressure of 80 to 100 pounds per square inch and at a paint pressure of 2 to 5 pounds per square inch. After spraying, the prime coat is air dried until practically all the liquids therein have been evaporated.

Following the prime coat an intermediate coat is applied so as to form a bond or adhesive between the prime coat and succeeding coats of vinyl applied thereto. This intermediate coat consists of an enamel having the following approximate composition by weight:

| | Per cent |
|---|---|
| Vehicle | 66 |
| Vinyl solids | 16 |
| Pigment | 18 |

The vehicle may consist of approximately 60% butyl acetate and of 40% methylisobutyl ketone. The pigment is made up largely of silica (sand), titanium oxide, lithopone and graphite. When suspended in solution the silica is present in about 25% by volume. This amount of silica gives body to the finished coat and presents a surface roughness desirable for good adhesion of succeeding coats.

To the composition set forth above is added a plasticizer such as dibutyl phthalate in the amount of 60 c.c.'s per gallon of solution. This plasticizer has been found to keep the film soft and pliable and adds to the lasting adhesion thereof.

The intermediate coat is likewise applied by a spraying operation. Since an enamel relatively high in vinyl solids is being sprayed, it is necessary to apply a wet coat. In other words it is necessary to have a heavy flow of material, yet not so heavy as to cause runs or sagging of such a relatively dense material. It has been found that if the material flow is too light or the air pressure too high, a blowing or solidifying action of the vinyl solids occurs in the spray due to the confined space in which the spraying operation is being carried on. If the solidified vinyl particles deposit on an already wetted or sprayed surface, the result is an extremely rough or porous surface that is hard to cover finally with a seal coat, thus giving rise to poor insulation resistance of the lining as a whole. This blowing or dusting phenomenon has been found to occur most along the bottom edge of the inner side walls of the container, and particularly the side wall first sprayed.

It has been found that by employing an air pressure of approximately 40 pounds per square inch and a paint pressure of approximately 15 pounds per square inch, an intermediate coat having the composition set forth above may be sprayed into the confined space with "blow" greatly minimized or substantially eliminated.

After spraying, the enamel coat is preferably permitted to dry thoroughly in air but, if desired, succeeding coats may be applied before the enamel has dried.

Up to this point in the process, the lining on the inside surface of the casing has relatively poor insulation resistance and is not acid proof. The two coats applied, the prime coat and the intermediate or enamel coat, have as their principal purpose the presenting of a surface on which it is possible to spray and have adhere satisfactorily one or more seal coats consisting substantially of a solution of a copolymer of vinyl chloride and vinyl acetate in a suitable solvent without the use of a high temperature bake which is characteristic of successful adhesions of Vinylite coatings when applied to bare metal. The adhesion of the seal coats described below is probably due to two conditions. First, the binder in the intermediate or enamel coat consists of vinyl solids and, of course, one vinyl solid will stick to the other. Second, the filler in the enamel coat is silica or sand which presents a roughened surface which is desirable from the adhesion standpoint.

Since the prime coat is not inert and since the intermediate coat is porous the combination does not have the requisite dielectric and acid resisting properties. It is therefore necessary to cover this combination with a material which will adhere thereto, will have the ability to resist attack by the electrolyte of the battery, and will have high dielectric strength. As mentioned above a copolymer of vinyl chloride and vinyl acetate dissolved in a suitable solvent has been found to be such a material.

Since high dielectric strength or the ability to resist voltage break down is a desirable property of the finished lining, the more vinyl solids that can be incorporated in the composition of the seal coats, the greater will be the covering power and the thicker will be the film for a given coat. Because of this it is desirable to incorporate as much dissolved vinyl solids as possible in the seal solutions without exceeding a figure of viscosity that is prohibitive from a spray standpoint.

A further factor which must be considered in the composition of the seal coat is the character of the solvent employed. If solvents are used which have high evaporation rates, entrapped air (bubbles) in the wet film is not released and the resulting film is porous. If a solvent having a lower evaporation rate is used, assuming that the substance is a good solvent for the vinyl compounds employed, it has been found that spraying can be accomplished at a low pressure, and since the film does not set up so readily, any entrapped air in the film escapes, thus producing a substantially continuous surface free from pin holes.

A further factor to be considered in the application of the seal coat is its ability to be sprayed inside the container where all of the air shot into the space is ejected into the atmosphere. In such a spraying operation considerable and immediate drying takes place by virtue of the high air circulation, and if high air pressures are used, solidified plastic flows around in the confined space and sticks to the wet surfaces causing the aforementioned "blow" which produces a very porous film. To prevent this it is necessary to reduce the spray pressures to a value where "blow" is a minimum.

In accordance with this invention three seal coats are employed. The approximate composition of the first seal coat by weight is as follows:

| | Per cent |
|---|---|
| Vinyl solids | 14–17 |
| Approximately dibutyl-phthalate | 3.5 |
| Mesityl oxide | 79.5–82.5 |

Mesityl oxide is the preferred solvent. However, a solvent mixture consisting of approximately 54% butyl acetate and 29% methyl isobutyl ketone, parts by weight, may be used.

As explained above, this material is sprayed at a relatively low air pressure and the flow of material is relatively heavy so as to eliminate fog or "blow." It has been found that an air pressure of 20 to 40 pounds per square inch and a paint pressure of 15 to 20 pounds per square inch permits satisfactory spraying of this material in the confined space.

After spraying, the first seal coat is permitted to dry for about 5 to 10 minutes in air and then a second seal coat having the following composition by weight is applied.

| | Per cent |
|---|---|
| Vinyl solids | 22 |
| Dibutyl phthalate | 4.5 |
| Carbon black | .75 |
| Mesityl oxide | 72.75 |

In spraying this material a heavy flow is maintained but the atomization is complete enough to eliminate many air bubbles. It has been found that the material can be effectively sprayed with an air pressure of about 30–40 pounds per square inch and a paint pressure of about 30 pounds per square inch. After the first coat of this material has been applied, the container is permitted to dry in air for five to ten minutes. A second seal coat of this material is then applied in the afore-described manner, thus making three seal coats in all. The air dry between successive seal coats functions to give each applied coat sufficient set to prevent runs or sags in the film. It will be understood however that this brief drying period does not produce complete drying and hence the succeeding coats are applied while the preceding coats are still wet.

After the last seal coat has been applied, the container is permitted to air dry until it is touch-proof. This requires from eight to twenty-four hours. Subsequent to this air dry the container is baked at a temperature of approximately 200° F., for 1½ to 2 hours. That is what may be called a low temperature bake, and its function is to rid the coating of any excess solvent. The temperature employed is below the boiling point of the solvent and thus some solvent is retained. This retained solvent acts as a plasticizer and imparts abrasion resistance and toughness to the coating. Moreover, it has been found that the small amount of solvent retained does not adversely affect the dielectric properties of the coating.

With the final low temperature bake the process of lining the container is completed, and in order to test its dielectric properties it is filled with an acid electrolyte or an aqueous solution of a wetting agent and subjected to a voltage stress of 500 volts A. C. Any breaks or discontinuities in the lining will be detected by such a test.

By following the foregoing process it has been found that an intimately bonded continuous lining of a polymerized vinyl resin is provided on the interior surface of a battery container made from a corrodible metal. This lining forms an acid and alkali resisting, abrasion resisting, high dielectric strength coating which is unaffected by the expansion and contraction of the metallic casing with temperature. Thus there is provided in accordance with this invention a light weight battery container, having a tough, long life, acid resisting lining which is capable of initially withstanding a voltage stress of at least 500 volts A. C.

While this invention has been set forth in detail, it will be understood that modifications may be made therein, and it is intended in the appended claims to cover all such modifications as come within the true spirit and scope of this invention.

I claim:

1. A light weight battery container comprising an aluminum container, the inner surface of which is provided with an acid and alkali resisting, abrasion resisting continuous coating which is sufficiently flexible to withstand the expansion and contraction of said aluminum container with temperature and is capable of withstanding an initial voltage stress of at least 500 volts A. C., said coating comprising a prime coat of a chlorinated rubber base resin paint having the property of adhering to the surface of said aluminum container, an enamel coat including a substantial amount of silica bonded to said prime coat, and a seal coat of a copolymer of vinyl chloride and vinyl acetate firmly adhering to said enamel coat.

2. The method of providing an intimately bonded continuous acid-resisting lining of high dielectric strength on the interior surface of a metallic container which includes the steps of treating said surface to remove undesirable films, applying a prime coat of a chlorinated rubber base resin paint, air drying to remove the solvents, then applying to said prime coat an intermediate enamel coat comprising a vehicle of butyl acetate and methyl-isobutyl ketone, in which is suspended vinyl solids and a pigment including silica and titanium oxide to which is added a plasticizer, applying to this intermediate coat a layer comprising a solution of a copolymer of vinyl chloride and vinyl acetate in a suitable solvent, allowing this final layer to air-dry until touch-proof, and then baking at a temperature below the boiling point of the solvent to retain a small proportion of the solvent.

3. The method of providing an intimately bonded continuous acid-resisting lining of high dielectric strength on an inner surface of a metallic container which includes the step of treating said surface to remove undesirable films, applying a prime coat of a chlorinated rubber base resin paint, air drying to remove the solvents, then applying to said prime coat an intermediate enamel coat containing vinyl solids and a substantial proportion by volume of silica, applying to this intermediate coat a layer comprising a solution of a copolymer of vinyl chloride and vinyl acetate in a suitable solvent and then baking at a temperature below the boiling point of the solvent to retain a small proportion of the solvent.

JOSEPH CHARLES DUDDY.